May 9, 1939.  G. A. SCHULZE  2,157,634
MAPPING DEVICE
Filed June 5, 1936  2 Sheets-Sheet 1
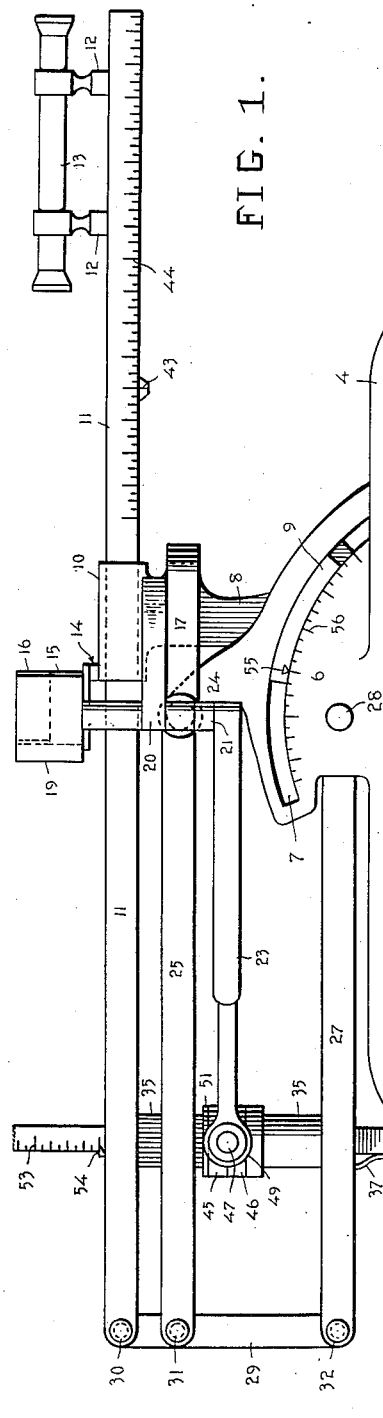
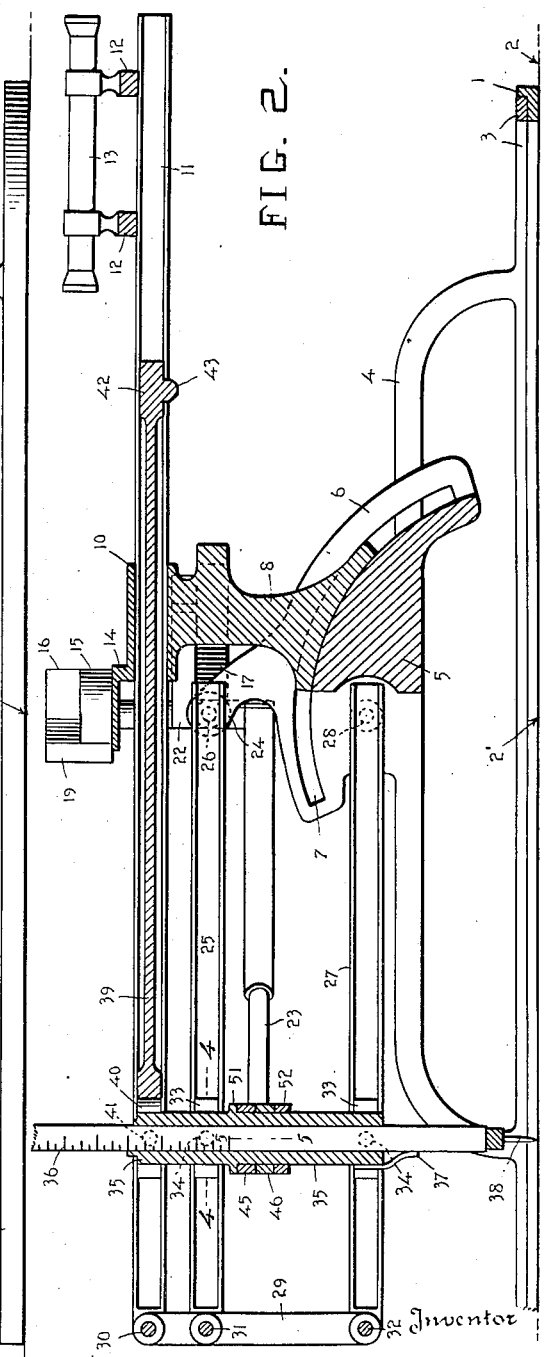

May 9, 1939.  G. A. SCHULZE  2,157,634
MAPPING DEVICE
Filed June 5, 1936   2 Sheets-Sheet 2
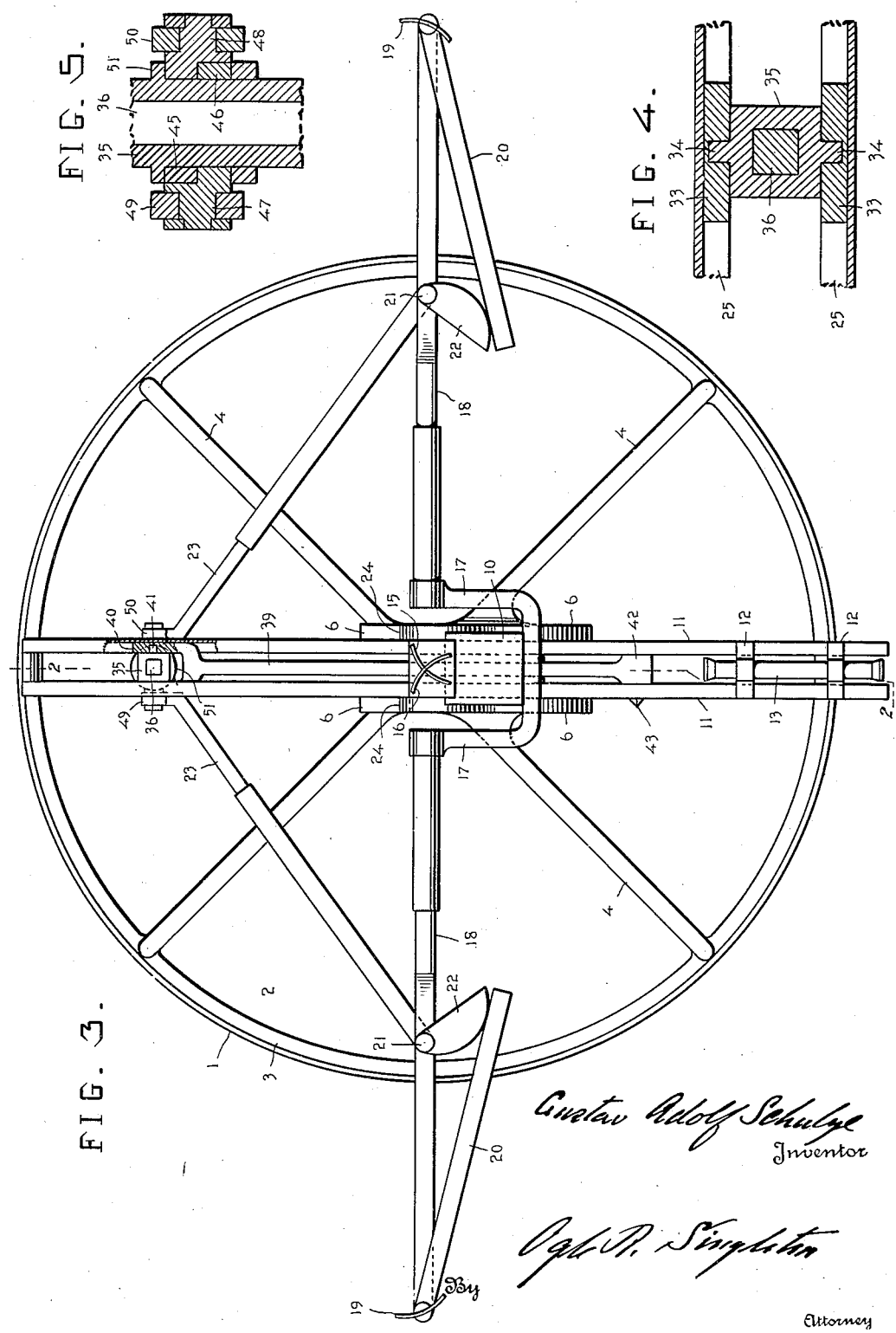

Patented May 9, 1939

2,157,634

UNITED STATES PATENT OFFICE 2,157,634

MAPPING DEVICE

Gustav Adolf Schulze, Brevard, N. C.

Application June 5, 1936, Serial No. 83,752

3 Claims. (Cl. 33—65)

My invention is a new and useful improvement in mapping devices and is designed to produce a precision instrument by which from a fixed observation point there can be ascertained the distances from said point to a plurality of observed points in the area to be mapped, and indications made upon a map sheet to produce a scale map on which are shown the desired features of the mapped area. By the use of my improved device, I can determine readily and accurately the oblique distances from the fixed point to the several observed points, the horizontal distances from the fixed point to the vertical planes of the observed points, and the vertical distances from the horizontal plane of the fixed point to the observed points. My improved device is adapted also for various other uses, such as the production of relief maps, and for slope stake location, etc., as will be readily understood by those skilled in the uses of such devices.

The particularly novel and useful features of my device are the means by which the mathematically accurate computations of the desired measurements are produced automatically by the mere observation of the precise points in the area to be mapped.

My improved device comprises, in combination with a map sheet, an observation means, such as a telescope, with angularly adjustable reflectors and operating means therefor which by the simple process of triangulation produce the mathematical computations when the operator secures the desired observations of the several points. The results are due to the fact that I have conceived and embodied in the structure of my device means for producing a plurality of determined ratios between the mathematical values secured by the various adjustments of the parts of my device and the actual relationships between determined points in the area to be mapped.

While I have illustrated in the drawings filed herewith and have hereinafter fully described one specific embodiment of my invention, it is to be distinctly understood that I do not consider my invention limited to said specific embodiment, but refer for its scope to the claims appended hereto.

In the drawings:

Fig. 1 is a side elevation of the device.

Fig. 2 is a transverse vertical section on the line 2—2 of Fig. 3.

Fig. 3 is a top plan view of the device.

Fig. 4 is a horizontal section on the line 4—4 of Fig. 2.

Fig. 5 is a vertical section on the line 5—5 of Fig. 2.

As illustrated in the drawings, my device comprises a base ring 1 to be fixed upon the map sheet 2 in any suitable way. This ring 1 carries the slidable ring 3 from which rise the four symmetrically disposed inwardly turned supports 4 on which is mounted the pedestal 5 carrying the upwardly extending parallelly disposed members 6 each provided with an arcuate slot 7. The slots 7 are designed as segments of an arc whose radius is drawn from the center 2' of the map sheet 2. Disposed between the members 6 is the upwardly projecting post 8 provided with outwardly projecting arcuate shoes 9 slidably mounted in the slots 7, and at its top with the sleeve 10 in which are slidably mounted the parallelly disposed U-beams 11 on which is fixed by the bridges 12 the telescope 13. Suitably mounted on the sleeve 10 is the bracket 14 carrying the superposed concave reflectors 15 and 16. It is to be understood that the reflectors 15 and 16 are so disposed that the horizontal plane of their meeting edges coincides with the longitudinal axis of the telescope 13, their vertical axes are disposed on a radius of the arcuate slots 7 from the center 2', and that the chords of the reflectors 15 and 16 form 45° angles with the horizontal axis of the telescope 13, and that the reflectors 15 and 16 reflect images from an angle of 90° to the left and right respectively. I provide on the post 8 the side brackets 17 on each of which is mounted the rod 18. These rods 18 are aligned at right angles to the beams 11 in such a way that the axes of the beams 11 and rods 18 intersect so as to coincide with the aligned vertical axes of the reflectors 15 and 16. At the outer end of each of the rods 18 there is pivotally mounted the concave reflector 19 provided with the operating lever 20 having any suitable form of resilient return means (not shown). Suitably journaled in each of the rods 18 there is a rock shaft 21 upon which is mounted an actuating cam 22 for operating the lever 20 of its associated reflector 19. It is to be understood that these cams 22 may be multiple cams so that adjustments of the cam 22 upon the shaft 21 will provide a variety of operating conditions for the reflector 19. For each of the rock shafts 21 there is provided the telescoping operating lever 23.

Each of the members 6 is provided with an upwardly projecting ear 24 on which is pivotally mounted a U-beam 25 on the pivot 26, and each of the members 6 has pivotally mounted thereon the U-beam 27 on the pivot 28. It is to be noted that the U-beams 25 and 27 are aligned vertically and that the pivots 26 and 28 are disposed upon the vertical plane passing through the center 2'. These two pairs of U-beams 25 and 27 are parallelly fixed, by a link 29 with pivots 30, 31 and 32 on the U-beams 11, 25 and 27 respectively.

As clearly indicated in Fig. 4, I provide shoes 33 slidable on the beams 25 in which are journaled the trunnions 34 on the sleeve 35. It is to be understood that I also provide these shoes 33 slidable in the beams 27. Slidably carried in this sleeve 35 is the indicator rod 36 with detent spring 37 and indicator pointer 38.

Slidably mounted in the beams 11 is the rod 39 having at its forward end the fork arms 40 slidable in the beams 11 and in which are received the trunnions 41 on the sleeve 35. The rod 39 is provided at its rear end with the head 42 slidable in the beams 11 and provided with the indicator pointer 43 co-acting with the indicator gauge 44 on one of the beams 11.

As indicated in Fig. 5, the sleeve 35 at its portion below the beams 25 is circular in cross-section and is provided with the rotatable collars 45 and 46 provided with the trunnions 47 and 48 respectively on which are journaled the collars 49 and 50 on the forward ends of the telescoping rods 23.

It is to be noted that the collars 45 and 46 are maintained in proper relation to the sleeve 35 by the flange 51 on the sleeve 35 and the fixed collar 52 mounted on the sleeve 35.

The indicator rod 36 has the indicator gauge 53 co-acting with the indicator pointer 54 on the sleeve 35.

One of the shoes 9 is provided with the indicator pointer 55 co-acting with the indicator gauge 56 on the corresponding member 6.

It is obvious that I can place upon the base ring 1 an indicator gauge and on the carrying ring 3 an indicator pointer, to indicate the horizontal angular adjustments of the device relative to the map sheet 2. It is also obvious that I can provide in association with my device means by which the device may be readjusted in relation to the map sheet 2, so that new fixed points of observation may be secured, and also that I can provide means by which the plane of the map sheet and my device associated therewith may be subject to variations of vertical angular adjustment.

From the foregoing description of the details of construction of my improved device, its use and operation will be obvious. The device is suitably mounted so that the map sheet 2 is in a horizontal plane, the center point 2' being disposed in vertical alignment with a given point determined as the center of the area to be mapped, and the device is fixed upon the map sheet 2 by any suitable fastening means upon the base ring 1, thus establishing the point 2' upon the map sheet 2 as the point of observation. By rotation of the ring 3 in the ring 1, the beams 11 may be brought to bear upon a given observed land mark, and by adjustment of the shoes 9 in the slots 7, the desired vertical angular adjustment of the beams 11 is secured so that the axis of the telescope 13 may be brought to bear upon the desired point in the area under observation.

The images of the area under observation are reflected by the reflectors 19 toward the reflectors 15 and 16. Due to the fact that the vertical length of each of the reflectors 15 and 16 is equal to one-half of the vertical length of the reflectors 19, and, as has been explained, these reflectors 15 and 16 are superposed, it is obvious that the reflectors 15 and 16 will reflect to the telescope 13 the lower and upper halves of the images respectively. Longitudinal movement of the rod 39 along the beams 11 actuating its associated mechanism, levers 23, cams 22 and levers 20, will obviously cause complementary angular variations of the reflectors 19, so that the observed half images, from the reflectors 15 and 16 may be caused to register. When this has been accomplished, the pointer 43 indicates upon the gauge 44 the oblique distance from the point of observation to the point observed.

It is to be noted that during the above-described operation of my device, the sleeve 35 has been maintained at an angle of 90° to the plane of the map sheet 2, by reason of its associated mechanism, parallelly disposed beams 25, and 27, and shoes 33 and link 29. When the above-described operation of my device has been accomplished, the indicator rod 36 is caused to move downwardly and the indicator pointer 38 contacting and marking the map sheet 2 indicates upon the map sheet 2 the position of the observed point in relation to the center point 2' of the map sheet 2. When the indicator point 38 contacts the map sheet 2, the indicator pointer 54 on the sleeve 35 indicates upon the gauge 53 the vertical distance from the plane of the point of observation to the point observed.

The indicator rod 36 is then moved upwardly to move the indicator pointer 38 from the map sheet 2. The shoes 9 are then moved in the slots 7 until the indicator pointer 55 reaches the zero point upon the indicator gauge 56, fixing the beams 11 parallel with the plane of the map sheet 2. The rod 39 is then adjusted so that the sleeve 35 is moved to position the indicator pointer 38 upon the ascertained and recorded point upon the map sheet 2, and the parts being thus adjusted the indicator pointer 43 indicates upon the gauge 44 the horizontal distance from the observed point to the vertical plane of the point of observation. It will be obvious that the imaginary line extended between the centers of the reflectors 19 is the base line of the device, and that the horizontal plane in which this line lies is the datum of the device, and that the vertical axis of the map sheet 2 passing through the center point 2' of the map sheet 2 intersects the datum of the device.

From the foregoing description of the operation of my device, it will be understood that the details of construction are so designed and related that there can be produced a plurality of determined ratios between the mathematical values secured by the adjustments of the parts of my device, and the actual relationships between determined points in the area to be mapped.

Having described my invention, what I claim is:

1. In a mapping device, the combination of a base adapted to be mounted on a map sheet; a pedestal rotatably mounted on said base and provided with a gauge; a post slidably mounted on said pedestal, capable of adjustment in a vertical arc described about the center of said base and map sheet, and provided with a pointer co-acting with the pedestal gauge; a pair of parallel beams slidably mounted on said post, one of said beams having a gauge; a pair of aligned rods fixed on said post, each rod extending at right angles to one of said beams; a concave reflector pivoted on the end of each rod and provided with an operating lever; a pair of superposed reflectors mounted upon said post; a telescope mounted on said beams, the pivoted reflectors, superposed reflectors and telescope being so designed and related that complementary half-images are reflected by the superposed reflectors from the pivoted reflectors to the telescope; a rod slidable on the beams and having a pointer co-acting with the beam gauge; a fork on said rod; a sleeve journaled in said fork; means adapted to maintain said sleeve at right angles to the plane of the map sheet; a pair of telescoping rods pivoted on said sleeve; a cam pivoted upon each of the aligned rods on a rock shaft, each rock shaft being attached to one of the telescoping rods, and said cams operating the levers of the pivoted reflectors; an indicator rod slidably mounted in the sleeve, co-acting with the map sheet, and provided with a gauge; and a pointer on said sleeve co-acting with the rod gauge.

2. In a mapping device, the combination of means adapted to mount said device upon a map sheet; a rotatable element carried by said mounting means; supporting media so mounted upon said rotatable element as to be capable of adjustment in a vertical arc described about a point on the vertical axis of the map sheet; a pair of reflectors pivotally mounted on said media and each provided with a lever; a pair of superposed reflectors fixed on said media; a telescope mounted on said media, the pivoted reflectors, superposed reflectors and telescope being so designed and related that complementary half-images are reflected by the superposed reflectors from the pivoted reflectors to the telescope; a rod slidably mounted on said media; a sleeve connected with said slidable rod; means adapted to maintain said sleeve at right angles to the plane of the map sheet; a pair of telescoping rods pivoted on said sleeve; a pair of cams pivoted on said media by means of rock shafts, each rock shaft being attached to one of said telescoping rods, and said cams operating the levers of the pivoted reflectors; and an indicator rod slidably mounted in said sleeve, co-acting with the map sheet.

3. In a mapping device, the combination of a base adapted to be mounted on a map sheet; a pedestal rotatably mounted on said base; a post slidably mounted on said pedestal, capable of adjustment in a vertical arc described about the center of said base and map sheet; a supporting element slidably mounted on said post; a pair of aligned rods fixed on said post, each rod extending at right angles to said supporting element; a reflector pivoted on the end of each rod and provided with an operating lever; a pair of superposed reflectors mounted upon said post; a telescope mounted on said supporting element, the pivoted reflectors, superposed reflectors and telescope being so designed and related that complementary half-images are reflected by the superposed reflectors from the pivoted reflectors to the telescope; a rod slidable on the supporting element; a sleeve connected with the slidable rod; means adapted to maintain said sleeve at right angles to the plane of the map sheet; a pair of telescoping rods pivoted on said sleeve; a cam pivoted upon each of the aligned rods, on a rock shaft, each rock shaft being attached to one of the telescoping rods, and said cams operating the levers of the pivoted reflectors; an indicator rod slidably mounted in the sleeve, co-acting with the map sheet; and indicating means on the sleeve and indicator rod adapted to indicate their relationship.

GUSTAV ADOLF SCHULZE.